United States Patent [19]

Pfefferle

[11] Patent Number: 5,234,882
[45] Date of Patent: Aug. 10, 1993

[54] CATALYST AND PREPARATION THEREOF

[76] Inventor: William C. Pfefferle, 51 Woodland Dr., Middletown, N.J. 07748

[21] Appl. No.: 780,801

[22] Filed: Oct. 22, 1991

[51] Int. Cl.$^5$ .................... B01J 37/14; B01J 35/10; B01J 21/04; B01J 23/89
[52] U.S. Cl. .................... 502/314; 502/336; 502/439
[58] Field of Search ............... 502/334, 335, 336, 439, 502/314

[56] References Cited

U.S. PATENT DOCUMENTS

| | | | |
|---|---|---|---|
| 3,944,504 | 3/1976 | Ford et al. | 423/213.5 X |
| 4,096,095 | 6/1978 | Cairns | 423/213.5 X |
| 4,188,309 | 2/1980 | Volker et al. | 502/527 X |
| 4,341,662 | 7/1982 | Pfefferle | 502/304 X |
| 4,397,770 | 8/1983 | Cairns et al. | 502/316 |

FOREIGN PATENT DOCUMENTS

| | | | |
|---|---|---|---|
| 1-119342 | 5/1989 | Japan | 502/439 |
| 2-172538 | 7/1990 | Japan | 502/439 |

Primary Examiner—W. J. Shine
Assistant Examiner—Douglas J. McGinty
Attorney, Agent, or Firm—Kane, Dalsimer, Sullivan, Kurucz, Levy, Eisele and Richard

[57] ABSTRACT

An improved process for the preparation of a catalyst surface on a base metal support of a ferrous metal comprises forming a barrier layer of a metal oxide, between the base support metal and the catalyst. The metal oxide barrier layer is formed by oxidation under particular temperature conditions of a metal layer which is bonded to the underlying support metal.

9 Claims, No Drawings

CATALYST AND PREPARATION THEREOF

BACKGROUND OF THE INVENTION

1. Field of the Invention

This invention relates to catalysts supported on metal structures of superior resistance to corrosion at both high and low temperatures and to methods for producing same. This invention also relates to a method for preparing non-porous stable oxide coatings on metal surfaces. In another aspect the present invention relates to a method for producing metal articles resistant to acidic corrosion at ambient temperatures. In still another aspect this invention relates to a method for preparing metal surfaces for coating with catalytic agents.

2. Brief Description of the Prior Art

Ceramic monolith structures are well known in the art as structural supports for a high surface area metal oxide layer, typically gamma alumina, on which is impregnated a suitable catalytic agent such as a noble metal like platinum. Because the gamma alumina is applied as a slip or slurry of alumina particles in an aqueous solution to a multichannel honeycomb, the honeycomb channels must be sufficiently large to permit flow through and removal of relatively viscous slurries. Another problem is that ceramic structures are subject to mechanical and thermal shock damage which can damage high surface area oxide layers. In addition, at moderately high temperatures the high surface area oxide layer can react with the ceramic support structure resulting in loss of catalyst activity. Consequently, there has been considerable interest in the use of metal honeycomb structures as catalyst structures. An important advantage of metal honeycombs is that the structure walls can be made much thinner than the walls of ceramic honeycombs. This allows for a greater open area in the flow direction for a given number of flow channels per unit area. Typically, such honeycomb catalysts are prepared by conventional slip coating methods on a suitably prepared metal surface, as described for example in the U.S. Pat. No. 4,188,309. Regardless of how the honeycomb structure is prepared for slip coating, application of a surface coating of a catalyst support significantly increases wall thickness, at least partially cancelling the benefits of having thin structure walls. A second disadvantage is that the thermal expansion differences between a metal and an oxide slip coating can result in spalling off of the relatively thick slip during thermal cycling. Consequently, in spite of the man potential advantages of metal monoliths as catalyst structural supports, metal monolith honeycomb catalysts have not heretofore displaced conventional ceramic honeycomb catalysts.

The U.S. Pat. No. 4,188,309 describes the state of the art as of 1978 and is incorporated herein by reference thereto.

SUMMARY OF THE INVENTION

Definition of Terms

The terms "monolith" and "monolith catalyst" in the present invention refer not only to conventional monolithic honeycomb structures and catalysts such as are employed in conventional catalytic converters but also to any equivalent unitary structure such as an assembly or roll of interlocking sheets or the like. The terms "carbonaceous pollutant" and "hydrocarbon" as used herein not only refer to organic compounds, including conventional liquid and gaseous fuels, but also to gas streams containing fuel values in the form of compounds such as carbon monoxide, organic compounds or partial oxidation products of carbon containing compounds and the like.

THE INVENTION

Dense, non-porous, corrosion resistant oxide surfaces suitable for coating with active catalytic agents are formed by high temperature oxidation of a diffusion bonded coating of a metal whose oxide is thermodynamically stable at high temperatures. Metals forming suitable support coatings include aluminum, cerium, thorium, yttrium, zirconium and the like. Monolith structures prepared with such metal oxide support surfaces can be directly coated with conventional catalytic agents such as a noble metal, for example platinum, palladium, rhodium, iridium, gold, silver and the like to yield high activity catalytic surfaces. The catalyst articles so prepared are useful, for example, to catalytically treat waste gases such as exhaust gases from internal combustion engines, thereby reducing air pollutants.

DETAILED DESCRIPTION OF THE PREFERRED EMBODIMENTS INVENTION

The base supporting metal rendered corrosion resistant by the process of the invention may be a ferrous metal, including iron, steel and alloys thereof.

In the present invention, a nonporous oxide surface is believed to be formed on the base metal support by oxidation of exposed surface and near surface atoms of the base metal to form a chemically bound, low porosity, thermodynamically stable surface layer impermeable to acidic attack and to oxidation in air at high temperatures.

Methods of applying a catalyst agent to a metal oxide support layer are well known in the art. For example, using the method of my U.S. Pat. No. 4,341,662, which is incorporated herein by reference thereto, chemically bound, catalytically active precious metal films are readily coated on the heat-resistant, acid resistant low porosity oxide surface. For aluminized steel, it has been found advantageous to first oxidize the aluminum surface by heating it in air at a temperature within the range of 910 to about 1050 degrees Kelvin, but more preferably between about 910 and 1000 degrees Kelvin. Heating times of thirty minutes or less (preferably 5 to 30 minutes) have been found to result in formation of a sufficiently protective oxide layer to allow solution coating thereon of catalytic compositions even with acidic solutions. It as been found that higher temperatures are disadvantageous. At temperatures over about 1100 degrees Kelvin, the alumina film formed is discontinuous, exposing the underlying surface to rapid corrosion by acidic catalytic coating solutions at ambient temperatures and by exposure to air at elevated temperature.

Using the method of the invention it is possible to prepare honeycomb catalysts with a higher open area in the direction of flow than if the same substrate were slip coated in the previously used conventional manner. Moreover, because the active catalyst metals are not buried within the pores of high surface area slipcoat particles, no active metal can be sealed off by sintering of such high surface area particles.

The present invention is further described in connection with the following examples, which describe the manner and process of making and using the invention and set forth the best mode contemplated by the inventor for carrying out the invention.

EXAMPLE I

An aluminized steel structure for catalyst coating was placed in an oven and heated at the rate of twenty degrees Kelvin per minute to 923 degrees Kelvin and held at temperature for thirty minutes. After cooling to ambient temperature a solution of a precious metal catalyst in accordance with the method of U.S. Pat. No. 4,341,662 was applied to the oxidized surface. No corrosion of the metal structure was observed. On firing the coated structure at 773 degrees Kelvin an adherent precious metal catalyst coating was obtained without significantly adding to metal wall thickness. The coated surface was found to be catalytically active.

EXAMPLE II (COMPARATIVE)

Using the same procedures as in Example I, supra., a test piece of the aluminized steel used in the structure employed in Example I, supra., was heated to 873 degrees Kelvin for thirty minutes and then cooled. On coating with the same catalyst solution as used in Example I, supra., the metal surface was attacked with evolution of gas bubbles.

EXAMPLE III (COMPARATIVE)

Using the especially preferred heat treating temperature as taught in U.S. Pat. No. 4,188,309, i.e.; 1143 degrees Kelvin, a sample of aluminized steel was placed in a preheated oven and held for fifteen minutes and then cooled. On coating the test piece with the same catalyst solution as used in Examples I and II, supra., the metal surface was vigorously attacked with evolution of gas bubbles as in Example II, supra. Microscopic examination showed that the surface was initially attacked at cracks at the grain boundaries with ultimate complete loss of the surface layer in many regions. Thus, although such a surface may be suitable for wash coating with catalyst support slurries, such a surface is vulnerable to corrosion without the protection of a protective coating such as provided by a wash coat of gamma alumina.

EXAMPLE IV

Two test pieces were prepared, one as in Example I, supra., and one as in Example III, supra., with both having catalyst coatings on only a portion of one side. Both test pieces were inserted into a hot oven at 1143 degrees Kelvin and held at temperature in air for a period of fourteen hours. On removal from the oven all surfaces on the coating prepared as in Example 1, supra., were found to be intact. All surface on the test piece oxidized at 1143 degrees Kelvin as in Example III, supra., were blistered and peeling with the underlying metal badly corroded.

What is claimed is:

1. A metallic catalyst structure for catalytic conversions, which comprises:
   a. a metallic structure having a first metal oxide surface formed by oxidation of a surface first metal layer bonded to an underlying aluminizing steel whereby said first metal layer forms an oxide stable in the presence of hydrogen at the temperature of use; and
   b. a coating of a catalytic composition directly on said first metal oxide surface, without an intervening wash coating of a second metal oxide.

2. The structure of claim 1 wherein said catalytic coating is chemically bonded to said oxide surface.

3. A process for preparing a supported metal catalyst, which comprises;
   providing a base metal support of a ferrous metal;
   coating the base metal with an oxide forming metal barrier layer;
   oxidizing the barrier layer by heating in air at a temperature within the range of from 910 to 1050 degrees Kelvin for a period of time sufficient to form a protective layer of the oxide of the metal which is chemically bonded to the support metal; and
   coating the metal oxide layer with an active metal catalyst.

4. A metallic catalyst structure for catalytic conversions, which comprises:
   a. a metallic structure having an alumina surface formed by oxidation of an aluminum layer at a temperature above 910 but below about 1000 degrees Kelvin, on an underlying ferrous metal support; whereby said alumina is stable in the presence of hydrogen at the temperature of use; and
   b. a coating of a catalytic composition on the alumina surface.

5. A corrosion-resistant, high-temperature stable metallic catalyst, which comprises;
   (a) a base support of a ferrous metal;
   (b) a barrier layer of a metal oxide on the base support, formed by oxidation of a surface layer of the oxide forming metal, whereby said oxide is chemically bonded to the underlying metal; and
   (c) an active metal catalyst coating directly on the barrier layer.

6. A method of protecting ferrous metals against corrosion, which comprises:
   a. coating a surface of the metal with a diffusion bonded surface layer of a metal which forms an oxide which is not reducible with hydrogen at the temperature of use; and
   b. oxidizing the surface layer in air at a temperature suitable for formation of a stable continuous layer of oxide.

7. A process for preparing a supported metal catalyst, which comprises;
   providing a base metal support of a ferrous metal;
   coating the base metal with an oxide forming metal barrier layer;
   oxidizing the barrier layer by heating in air at a temperature and for a period of time sufficient to form a protective layer of the oxide of the metal which is chemically bonded to the support metal; and
   coating the metal oxide layer with an active metal catalyst.

8. A method of protecting ferrous metals against corrosion, which comprises:
   a. coating a surface of the metal with a diffusion bonded surface layer of aluminum which forms an oxide which is not reducible with hydrogen at the temperature of use; and
   b. oxidizing the aluminum surface layer in air at a temperature within the range of about 910 to 1000 degrees Kelvin.

9. The process of claim 7 wherein the metal oxide is alumina.

* * * * *